(12) United States Patent
Suetake

(10) Patent No.: US 6,343,300 B1
(45) Date of Patent: Jan. 29, 2002

(54) FILE UPDATING METHOD CAPABLE OF UPDATING AN OPERATION FILE WITHOUT INTERRUPTING ONLINE PROCESSING

(75) Inventor: Akio Suetake, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/220,429

(22) Filed: Dec. 24, 1998

(30) Foreign Application Priority Data

Dec. 25, 1997 (JP) ............................................. 9-366150

(51) Int. Cl.[7] ............................................... G06F 17/30
(52) U.S. Cl. ......................... 707/203; 707/205; 710/13; 713/200; 200/339; 379/350
(58) Field of Search ................................. 707/203, 205; 710/100; 713/200; 714/13; 200/339; 379/350

(56) References Cited

U.S. PATENT DOCUMENTS 5,699,504 A * 12/1997 Mano .......................... 714/13
6,178,429 B1 * 1/2001 Cherf .......................... 707/205
6,286,101 B1 * 9/2001 Suzuki ........................ 713/200

OTHER PUBLICATIONS

Japanese Office Action issued Dec. 7, 1999 in a related application and English translation of relevant portions.

* cited by examiner

Primary Examiner—Thomas Black
Assistant Examiner—Charles L. Rones
(74) Attorney, Agent, or Firm—Ostrolenk, Faber, Gerb & Soffen, LLP (57) ABSTRACT

An input/output control device (11) comprises a dual processor system. Supplied with a file update request, first and second processors (12, 14) perform individual processing independently of each other. While the first processor (12) processes a processing request from an input/output device (18) with a current operation file, a new operation file is loaded from a storage medium (17) to a second memory (15). At a predetermined timing, input/output control is switched from the first processor (12) to the second processor (14). Thereafter, judgement is made about whether or not a new processing request subsequently received is an existing call already triggered in the current operation file or a new call newly triggered. In case of the existing call, the call is transmitted through a data transmission/reception unit (16) to the first processor (12) to perform processing with the current operation file. In case of the new call, the processing is performed with the new operation file to produce a processed output. After completion of all processing about the existing call, the content of the second memory (15) is copied into a first memory (13).

8 Claims, 7 Drawing Sheets

FILE UPDATING METHOD CAPABLE OF UPDATING AN OPERATION FILE WITHOUT INTERRUPTING ONLINE PROCESSING

BACKGROUND OF THE INVENTION

This invention relates to a file updating method used in an input/output control device in updating an operation file from a current operation file into a new operation file and, in particular, to an input/output control device for updating an operation file without interrupting online processing for a plurality of external processing requests.

An input/output control device responsive to a plurality of external processing requests for executing online processing often comprises two input/output control devices for executing same processing in preparation for occurrence of a system failure. One of the two input/output control devices is continuously operated as a current system. Upon occurrence of a failure in the current system, processing is handed over or inherited to a spare system so as to prevent interruption of the online processing. In the above-mentioned approach, however, it is necessary to inherit data before occurrence of the failure so as to enable the spare system to inherit the processing. If the failure in the current system is critical, it is impossible to inherit the processing before occurrence of the failure. In addition, since the spare system is activated after occurrence of the failure, it takes a time before restart of the processing.

Therefore, in case of an exchange system required to perform online and realtime processing, it is effective to make the two input/output control devices simultaneously perform the same processing. Specifically, the two input/output control devices are simultaneously operated, one as the current system which effectively perform input/output control for an external apparatus, the other as the spare system which performs input control but is not authorized to perform output control. Upon occurrence of the failure in the current system, the processing can be inherited simply by switching the output control because the spare system performs the same processing. Thus, the realtime processing is not interrupted so that the system is stable and reliable.

In the electronic exchange operated as mentioned above, it is sometimes required to update an operation file from a current operation file to a new operation file in order to offer a new service to customers during operation of the exchange system. In such a case, if the exchange is entirely suspended to update the operation file, an exchange operation is interrupted to cause troubles in system operation. In addition, when the processing is restarted with the new operation file, the data upon operation must be supplied again. In view of the above, it is desired to provide a novel input/output control device capable of updating the operation file without interrupting the exchange operation and with the data inherited. For example, Japanese Unexamined Patent Publication (JP-A) No. 8-242474 proposes a digital private exchange which carries out such a file update operation.

Figure 1:
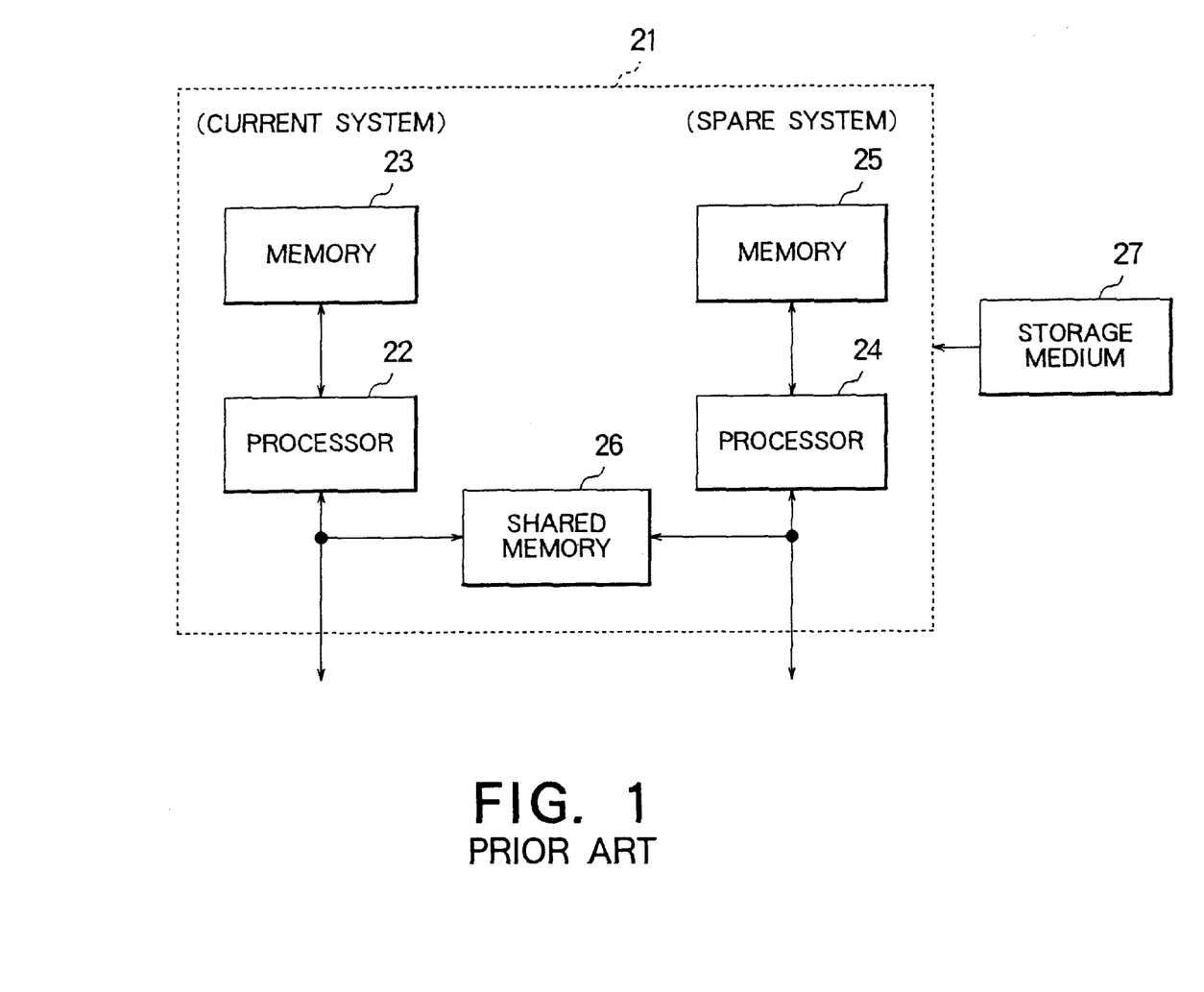
FIG. 1 is a block diagram of a conventional input/output control device as a private exchange.

FIG. 1 schematically shows a structure of a processor unit in the private exchange. The processor unit 21 comprises a first processor 22 and a second processor 24 connected to a first memory 23 and a second memory 25 corresponding thereto, respectively. These components form a dual processor system in preparation for occurrence of a failure. The first and the second processors 22 and 24 share a shared memory 26 for transferring data therebetween. Typically, the first processor 22 is operated as a current system to control an entirety of the private exchange while the second processor 24 is operated as a spare system. Through the shared memory 26, information about every call from a telephone set not shown in the figure is transferred so as to maintain synchronization in exchange operation. The processor unit 21 is connected to a storage medium 27 for storing an update program for updating an operation file from a current operation file to a new operation file.

Next, description will be made about the file update operation executed by the private exchange. The private exchange is in a normal operation state by the use of the current system and the spare system. Both of the current and the spare system are responsive to the external processing requests to perform processing with the current operation file. If a file update request is issued to the private exchange, at first the second processor 24 is separated from the online processing to be put into an offline state. Then, the new operation file is loaded from the storage medium 27 to the second memory 25 in the spare system. On the other hand, the first processor 22 in the current system continuously performs the processing with the current operation file in response to the external processing requests. Since the exchange operation is performed by the first processor 22 alone, status data upon operation which are changed due to the processing with the current operation file are stored in the first memory 23 alone.

When the new operation file is loaded in the second memory 25, initialization is carried out in order to start the processing with the new operation file. After completion of the initialization, the status data stored in the first memory 23 are copied through the shared memory 26 into the second memory 25. When the status data are copied into the second memory 25, the second processor 24 is switched from the spare system into the current system. Thus, it is possible to carry out the file update operation without suspending the entirety of the exchange and to restart the processing with the new operation file by straightforwardly inheriting the status data in the current operation file.

In the above-mentioned file update operation in the private exchange, the status data in the current operation file are directly copied from the first memory 23 in order that the second processor 24 starts the processing with the new operation file. If the new operation file requires modification of a data structure of the status data in the current operation file, it is necessary to perform abstraction of the status data by the use of a predetermined abstraction syntax and to perform syntax analysis in the new operation file in order to inherit the status data in the current operation file by the new operation file. In addition, development of the new operation file inevitably depends upon the structure of the status data. Therefore, the new operation file is so increased in program scale that the development is difficult to result in decrease in productivity.

In the conventional electronic exchange, the dual processor system of a synchronous type is formed so that the current system and the spare system can not execute processing independently from each other. Therefore, in the exchange of this type, the spare system is loaded with the new operation file and then the online processing by the current system is interrupted to perform restart initialization for restarting the processing with the new operation file. After completion of the restart initialization, the processing with the new operation file is started. In this approach, the exchange operation is unfavorably interrupted while the restart initialization is performed on the side of the new operation file.

In view of the above, Japanese Unexamined Patent Publication (JP-A) No. 5-81218 proposes an input/output control device comprising a signal distributor and capable of updating the operation file without interrupting the online processing. The signal distributor serves to distribute external signals to the current and the new operation files so that the file update operation is carried out without interrupting the online processing.

Figure 2:
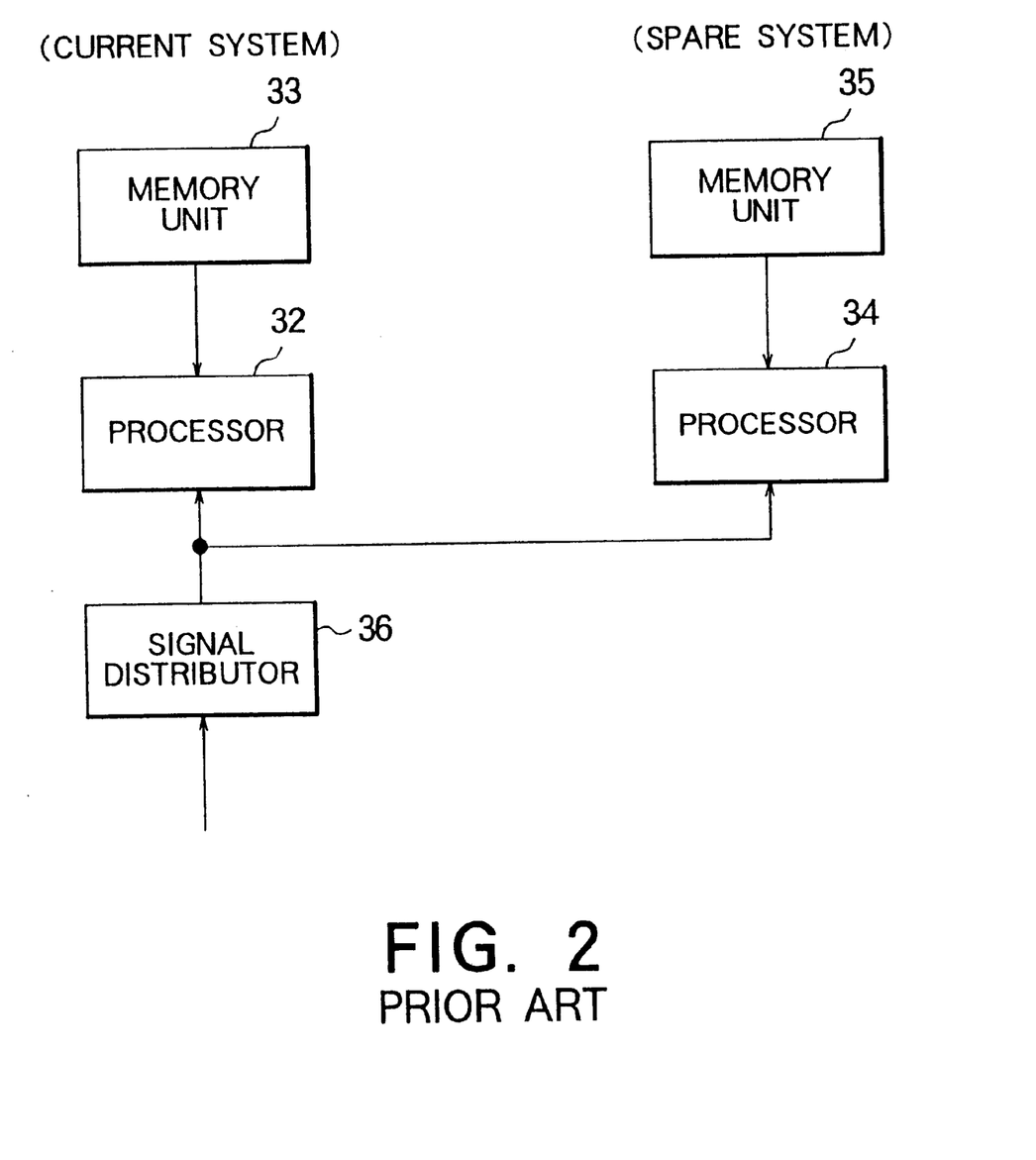
FIG. 2 is a block diagram of another conventional input/output control device.

FIG. 2 shows one example of the input/output control device proposed in the above-mentioned publication. A first processor 32 and a second processor 34 forms a dual processor system in preparation for occurrence of a failure. Typically, the first processor 32 serves as a current system while the second processor 34 serves as a spare system. A first external memory 33 and a second external memory 35 store new operation files to be loaded into the first and the second processors 32 and 34 corresponding thereto, respectively. A signal distributor 36 serves to distribute external signals to the first and the second processors.

Description will be made about the file update operation carried out in the input/output control device. The input/output control device comprises the current system and the spare system and is in a normal operation state. The current and the spare systems are responsive to external signals and perform the processing with the current operation file. Upon issuance of a file update request, the normal operation state proceeds to a state in which the first and the second processors 32 and 34 perform individual processing independently of each other. The second processor 34 in the spare system is separated from the online processing. Therefore, external processing requests are delivered by the signal distributor 36 to the first processor 32 in the current system alone. The first processor 32 is responsive to the processing requests supplied thereto and continues the processing with the current operation file. On the other hand, the second processor 34 in the spare system is loaded with the new operation file.

After the new operation file is loaded in the second processor 34, the signal distributor 36 continuously delivers the processing requests to the first processor 32 until all processing by the first processor 32 with the current operation file is completed. When the processing by the first processor 32 with the current operation file is entirely completed, the signal distributor 36 then delivers to the second processor 34 new processing requests after the time instant of the above-mentioned completion of the processing. The second processor 34 is responsive to the processing requests supplied thereto and starts the processing with the new operation file. Thereafter, the content of the second processor 34 is copied into the first processor 32. Thus, both of the first and the second processors 32 and 34 in the current and the spare systems are updated to the new operation file and put into synchronous operation.

In the device in which the file update operation is performed as described above, the processing is switched to the new operation file after completion of all processing with the current operation file. Therefore, it is unnecessary to inherit the status data in the current operation file. However, there remains a problem in an apparatus, such as the electronic exchange, which performs the online processing with the status data monitored for a predetermined time duration. Specifically, the exchange operation at the electronic exchange comprises a series of processing starting from call origination that a subscriber picks up a handset to transmit a dial tone, followed by reception of dial numbers, calling of a called subscriber, connection of a line, and disconnection of the line. Therefore, it is necessary to provide a continuous service from the call origination to the disconnection of the line while monitoring the status data corresponding to each processing. In addition, when the processing requests are delivered from a plurality of subscribers from time to time, the above-mentioned series of processing must be carried out in parallel.

However, in such a device that a new processing request is delivered to the new operation file after perfect completion of the processing with the current operation file, the processing can not be started for those processing requests newly produced before completion of the processing with the current operation file. Therefore, the exchange operation is temporarily interrupted for the external processing requests produced from time to time.

SUMMARY OF THE INVENTION

It is therefore an object of this invention to provide a file updating method capable of updating an operation file without interrupting online processing in response to external processing requests.

Other objects of this invention will become clear as the description proceeds.

According to this invention, there is provided a file updating method of updating, into a new operation file, an operation file which is used in an input/output control device in controlling an input/output device, the input/output control device comprising first and second memories, each memorizing a current operation file as the operation file, first and second processors connected to the first and the second memories, respectively, and a storage medium for storage of the new operation file, each of the first and the second processors processing, when receives an external processing request from the input/output device, the external processing request into processed data in accordance with the current operation file, the first processor outputting the processed data to the input/output device, the file updating method being for updating the operation file of the input/output control device into the new operation file when the input/output control device receives an update request from the input/output device, the file updating method comprising:

a storing step at which the second processor stores, when the input/output control device receives the update request from the input/output device, the new operation file from the storage medium into the second memory with the second processor inhibited from receiving the external processing request;

a switching step at which switching of reception of the external processing request from the first processor to the second processor is executed at a switching timing after the new operation file is stored in the second memory, the second processor processing, when receives the external processing request after execution of the switching, the external processing request into the processed data in accordance with the new operation file and outputting the processed data to the input/output device, the first processor being inhibited from receiving the external processing request after execution of the switching; and a replacing step at which the first processor replaces the current operation file of the first memory by the new operation file stored in the second memory after the first processor finishes processing, in accordance with the current operation file, the external processing request received at the first processor.

According to this invention, there is also provided a file updating method of updating, into a new operation file, an operation file which is used in an input/output control device in controlling an input/output device, the input/output control device comprising first and second memories, each memorizing a current operation file as the operation file, first and second processors connected to the first and the second memories, respectively, and a storage medium for storage of the new operation file, each of the first and the second processors processing, when receives an external processing request from the input/output device, the external processing request into processed data in accordance with the current operation file, the first processor outputting the processed data to the input/output device, the file updating method being for updating the operation file of the input/output control device into the new operation file when the input/output control device receives an update request from the input/output device, the file updating method comprising:

a storing step at which the second processor stores, when the input/output control device receives the update request from the input/output device, the new operation file from the storage medium into the second memory with the second processor inhibited from receiving the external processing request;

a switching step at which switching of reception of the external processing request from the first processor to the second processor is executed at a switching timing after the new operation file is stored in the second memory, the second processor receiving the external processing request after execution of the switching is carried out, the first processor being inhibited from receiving the external processing request after execution of the switching;

a judging step at which the second processor judges whether or not the external processing request received after execution of the switching is related to the external processing request which is received by the first processor before execution of the switching;

a forcing step at which, when the second processor judges that the external processing request received after execution of the switching is related to the external processing request received by the first processor before execution of the switching, the second processor forces the first processor to continuously process, in accordance with the current operation file, the external processing request received after execution of the switching;

a processing step at which, when the second processor judges that the external processing request received after execution of the switching is not related to the external processing request received by the first processor before execution of the switching, the second processor processes, into the processed data in accordance with the new operation file, the external processing request received after execution of the switching and outputs the processed data to the input/output device; and a replacing step at which the first processor replaces the current operation file of the first memory by the new operation file stored in the second memory after the first processor finishes processing, in accordance with the current operation file, the external processing request received from the input/output device before execution of the switching and the external processing request received from the second processor after execution of the switching.

According to this invention, there is also provided a file updating method of updating, into a new operation file, an operation file which is used in an input/output control device in controlling an input/output device, the input/output control device comprising first and second memories, each memorizing a current operation file as the operation file, first and second processors connected to the first and the second memories, respectively, and a storage medium for storage of the new operation file, each of the first and the second processors processing, when receives an external processing request from the input/output device, the external processing request into processed data in accordance with the current operation file, the first processor outputting the processed data to the input/output device and storing to the first memory discriminating information representative of the external processing request received by the first processor from the input/output control device, the file updating method being for updating the operation file of the input/output control device into the new operation file when the input/output control device receives an update request from the input/output device, the file updating method comprising:

a storing step at which the second processor stores, when the input/output control device receives the update request from the input/output device, the new operation file from the storage medium into the second memory with the second processor inhibited from receiving the external processing request;

a switching step at which switching of reception of the external processing request from the first processor to the second processor is executed at a switching timing after the new operation file is stored in the second memory, the second processor receiving the external processing request after execution of the switching is carried out, the first processor being inhibited from receiving the external processing request after execution of the switching;

a judging step at which the second processor judges with reference to the discriminating information stored in the first memory whether or not the external processing request received after execution of the switching is related to the external processing request which is received by the first processor before execution of the switching;

a forcing step at which, when the second processor judges that the external processing request received after execution of the switching is related to the external processing request received by the first processor before execution of the switching, the second processor forces the first processor to continuously process, in accordance with the current operation file, the external processing request received after execution of the switching;

a processing step at which, when the second processor judges that the external processing request received after execution of the switching is not related to the external processing request received by the first processor before execution of the switching, the second processor processes, into the processed data in accordance with the new operation file, the external processing request received after execution of the switching and outputs the processed data to the input/output device; and a replacing step at which the first processor replaces the current operation file of the first memory by the new operation file stored in the second memory after the first processor finishes processing, in accordance with the current operation file, the external processing request received from the input/output device before execution of the switching and the external processing request received from the second processor after execution of the switching.

DESCRIPTION OF PREFERRED EMBODIMENT

Now, this invention will be described in detail in conjunction with an embodiment thereof.

Figure 3:
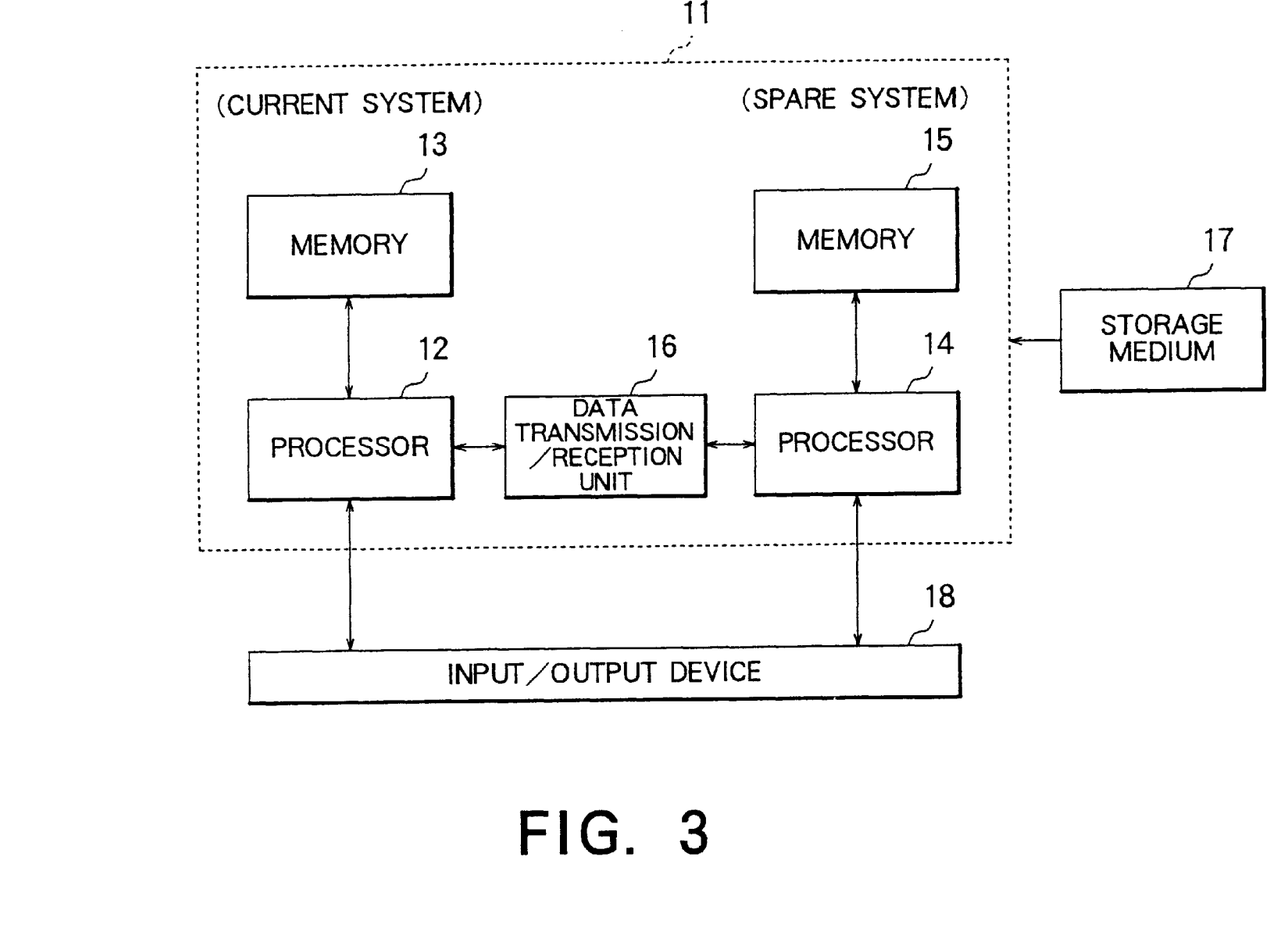
FIG. 3 is a block diagram of an input/output control device according to one embodiment of this invention.

Referring to FIG. 3, an input/output control device 11 as an electronic exchange according to one embodiment of this invention comprises a first processor 12 and a second processor 14 and controls an input/output device 18. The first and the second processors 12 and 14 are connected to first and second memories 13 and 15 corresponding thereto, respectively, to form a dual processor system. The first memory 13 temporarily stores a control program for the first processor 12 and various kinds of data. The second memory 15 temporarily stores a control program for the second processor 14 and various kinds of data. Thus, each of the first and the second memories 13 and 15 stores the control program as a current operation file. Responsive to processing requests received from external telephone sets (not shown) through the input/output device 18, the first and the second processors 12 and 14 simultaneously execute the same processing in preparation for occurrence of a failure. If the first processor 12 is a current system, processed results of the first processor 12 are produced as effective outputs in response to the external processing requests and are delivered to the input/output device 18. A data transmission/reception unit 16 is connected to the first and the second processors 12 and 14 and carries out data transmission/reception between the first and the second processors 12 and 14. A storage medium 17 serves to store an update program for updating an operation file from the current operation file to a new operation file.

Figure 4:
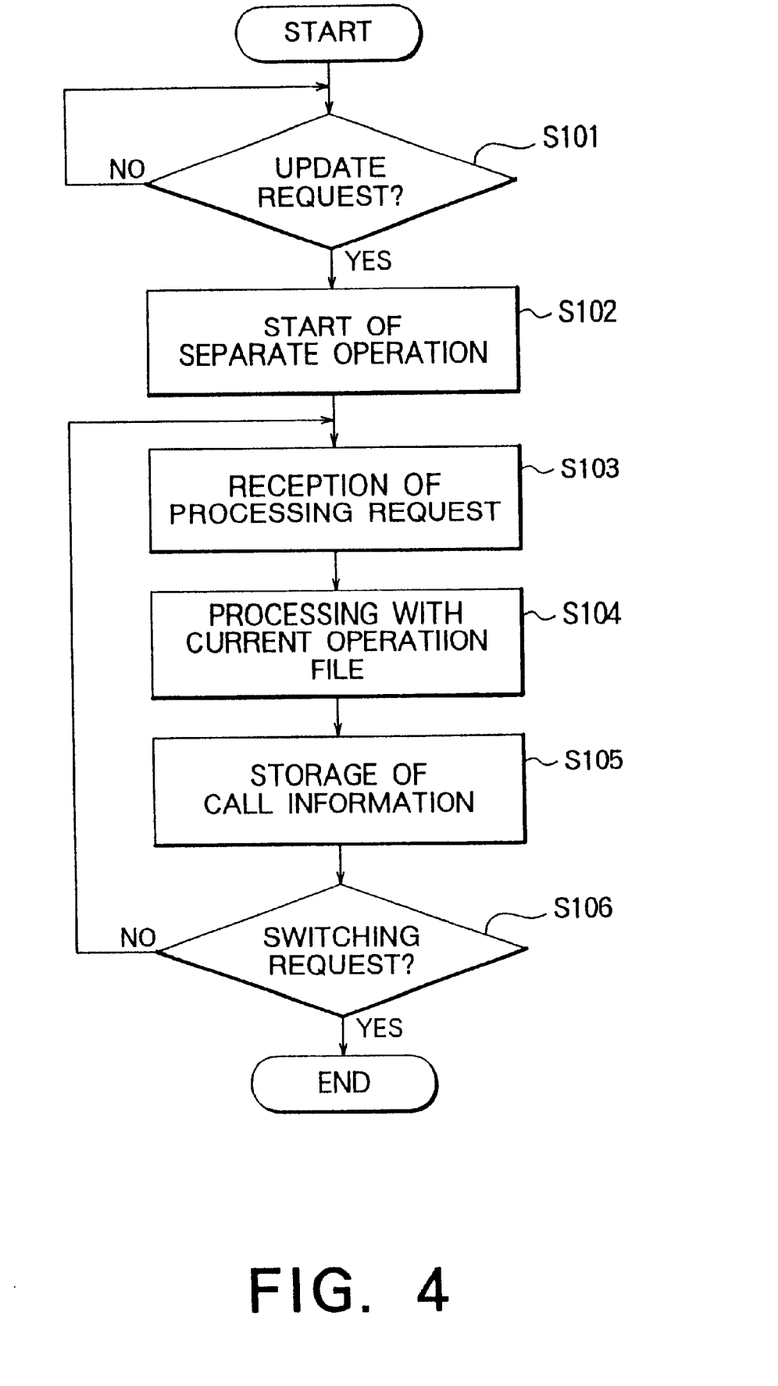
FIG. 4 is a flow chart for describing an operation of a first processor upon occurrence of a file update request.

Referring to FIG. 4, description will be made about an operation of the first processor 12 when a file update request is delivered through the input/output device 18 to the input/output control device 11 of the above-mentioned structure. The first processor 12 is operated as the current system. Upon reception of the file update request from the outside, the second processor 14 as a spare system is requested to start a separate operation (step S101: Y). In response thereto, a synchronous operation is cancelled to start the separate operation in which the first and the second processors 12 and 14 perform individual processing independently of each other (S102).

After start of the separate operation, the first processor 12 receives external processing requests in the manner similar to that before start of the separate operation (step S103). The processing is performed with the current operation file to produce a resultant output (step S104). In addition, information about a call triggered in the current operation file (hereinafter referred to as "discriminating information") is memorized in the first memory 13 (step S105). Until an input/output control switching signal is supplied from the second processor 14, the first processor 12 continues an exchange operation with the current operation file (step S106: N).

Figure 5:
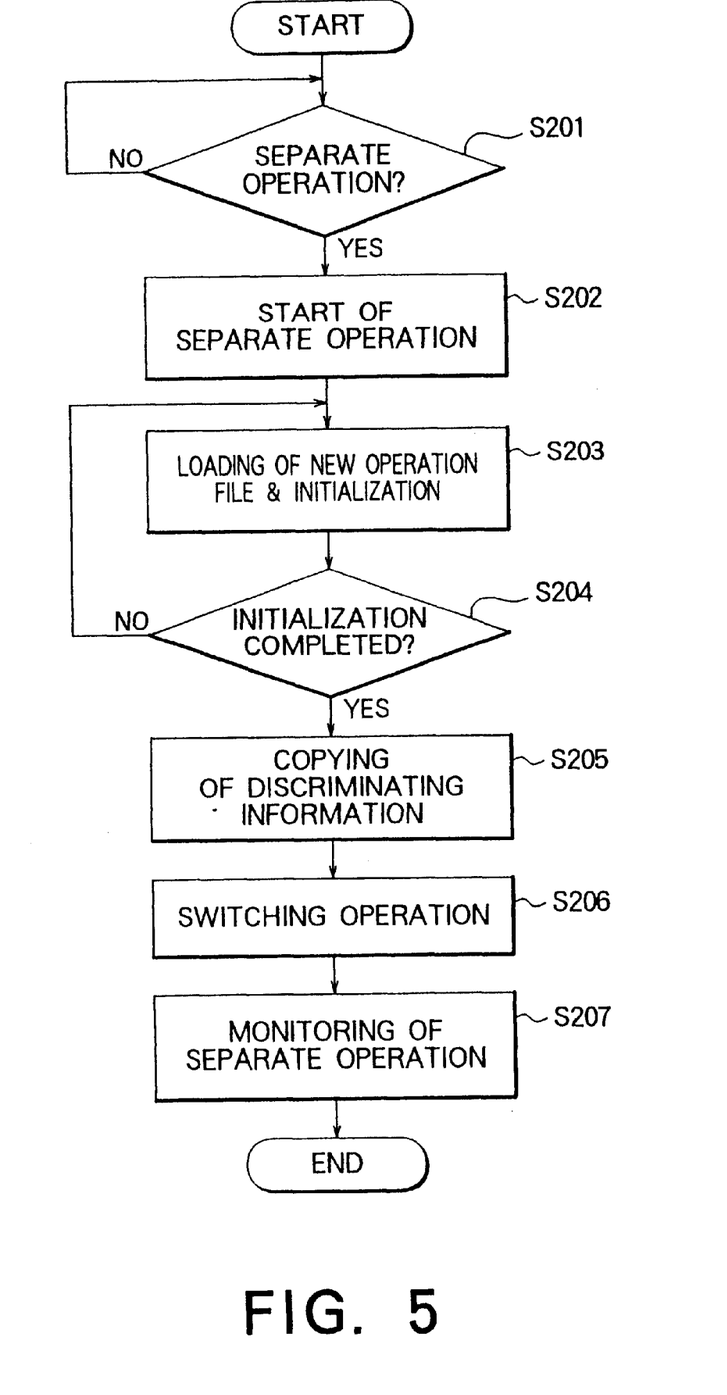
FIG. 5 is a flow chart for describing an operation of a second processor after start of a separate operation.

Referring to FIG. 5, description will be made about an operation of the second processor 14 upon issuance of the file update request. The second processor 14 acts as the spare system. When the start of the separate operation is requested from the first processor 12 (step S201: Y), the separate operation is started (step S202). As a result, the second processor 14 stops the operation as the spare system and no longer receives external processing requests. After the new operation file is loaded in the second memory 15 so that the new operation file is stored in the second memory 15 instead of the current operation file, restart initialization is performed in order to carry out the processing with the new operation file (step S203).

When the restart initialization is completed (step S204: Y), the second processor 14 transmits to the first processor 12 a signal representative of completion of the restart initialization. In response to the signal, the information (discriminating information) related to the call triggered in the current operation file and memorized in the first memory 13 is copied into the second memory 15 (step S205). Then, input/output control is switched from the first processor 12 into the second processor 14 (step S206). As a result, external processing requests are received by the second processor 14 alone.

Simultaneously with the switching of the input/output control, separate operation time monitoring is started to monitor a separate operation time (step S207). Herein, the separate operation time monitoring is an operation of monitoring the separate operation time 80 that the separate operation is cancelled to return to the synchronous operation after lapse of a predetermined time duration. While the processing is carried out in the state of the separate operation, a parallel operation by both of the current and the spare systems is interrupted. Taking this into account, the predetermined monitoring time is preliminarily provided in preparation for occurrence of a failure.

Figure 6:
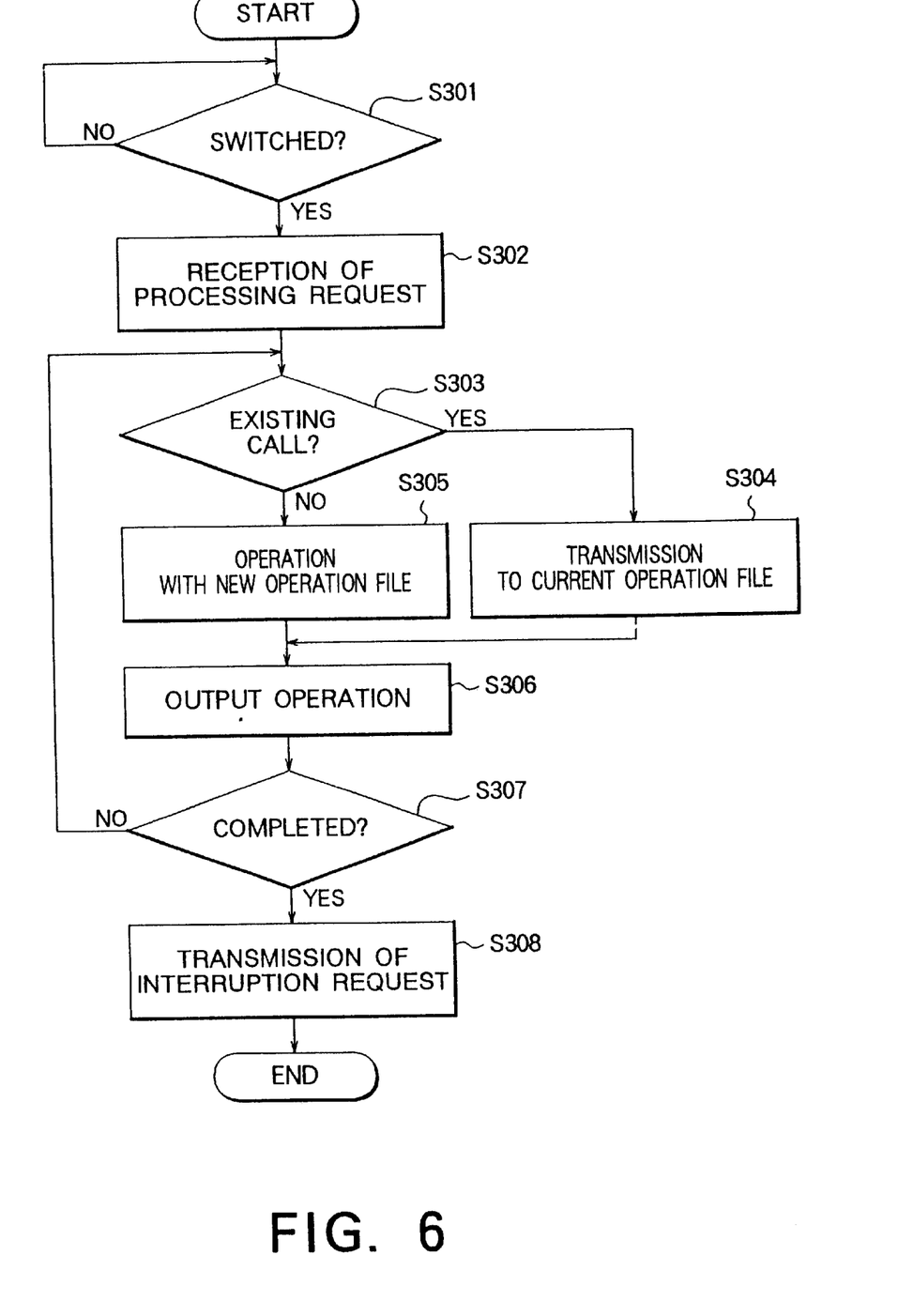
FIG. 6 is a flow chart for describing an operation of the first processor after switching of input/output control.

Referring to FIG. 6, description will be made about an operation of the second processor 14 after the input/output control is switched to the second processor 14. After switching of the input/output control (step S301: Y), the second processor 14 receives an external processing request (step S302) and carries out processing request judgement (step S303). The processing request judgement is an operation of judging whether the external processing request is a call already triggered in the current operation file or a call newly triggered.

When the judgement result shows the call already triggered (step S303: Y), the processing request in question is transmitted through the data transmission/reception unit 16 to the first processor 12 (step S304). Thereafter, when the processed result is supplied from the first processor 12 through the data transmission/reception unit 16, the processed result is delivered to the input/output device 18 (step S306). On the other hand, when the judgement result shows the call newly triggered (step S303: N), the second processor 14 performs the processing with the new operation file (step S305). Then, the processed result is delivered to the input/output device 18 (step S306).

When the processing related to the call already triggered in the current operation file is completed or when the separate operation time monitored by a separate operation monitoring processor unit has lapsed (step S307: Y), the second processor 14 transmits a processing interruption request to interrupt the processing by the first processor 12 (step S308).

Figure 7:
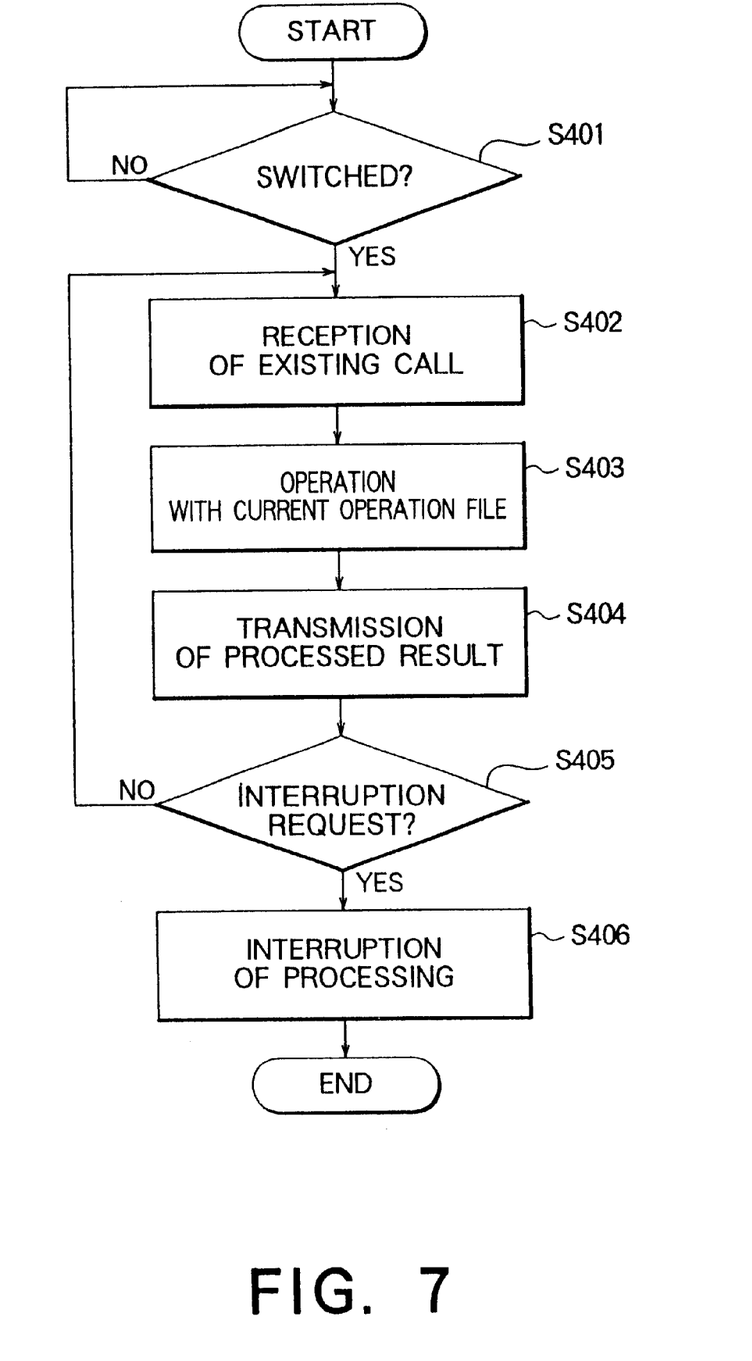
FIG. 7 is a flow chart for describing an operation of the second processor after switching of the input/output control.

Referring to FIG. 7, description will be made about an operation of the first processor 12 after the input/output control is switched to the second processor 14. After switching (step 401: Y), the call already triggered in the first processor 12 is transmitted from the second processor 14 through the data transmission/reception unit 16 (step S402). The first processor 12 executes the processing with the current operation file with respect to the call already triggered (step S403). The result is transmitted through the data transmission/reception unit 16 to the second processor 14 (step S404). Until the processing interruption request is supplied from the second processor 14, the first processor 12 continues the processing with respect to the call already triggered (step 405: N). When the processing interruption request is supplied from the second processor 14 (step 405: Y), the first processor 12 stops the processing with the current operation file (step S406).

After the first processor 12 stops the processing with the current operation file, the content stored in the second memory 15 and related to the new operation file is copied into the first memory 13. After completion of the copying, the second processor 14 transmits a separate operation cancelling request to the first processor 12. As a result, the separate operation is finished so that both of the first and the second processors 12 and 14 start the exchange operation with the new operation file.

In the foregoing embodiment, description has been made about the electronic exchange. However, this invention is also applicable to an input/output control device for carrying out processing while monitoring status data related to the processing for a predetermined time duration from the start to the end of the processing. The foregoing embodiment is directed to the input/output control device comprising the first and the second processors. However, this invention is applicable to two processors of an input/output control device comprising three or more processors.

As described above, according to an aspect of this invention, the current operation file is replaced at the predetermined timing by the new operation file to receive the external processing requests and to perform the processing. After completion of all processing received by the current operation file, the new operation file is used as a new current operation file. Therefore, even if all processing with the current operation file is not yet completed, the processing can be started for those external processing requests newly produced. Thus, it is possible to perform the file update operation without interrupting the online processing in response to the external processing requests.

The processing requests received by the current operation file and the processing requests received by the new operation file are processed by the current operation file and the new operation file, respectively. Therefore, it is unnecessary to copy the status data from the current operation file to the new operation file. Thus, even if the new operation file has a new function and requires modification of the structure of the status data, the program can be developed independently of the status data with the current operation file. As a result, the volume of the developed program can be minimized and the productivity is improved.

According to another aspect of this invention, the processing request after switching of the input/output control is judged. If the processing request is the one already triggered, the processing is performed with the current operation file. If the processing request is the one newly triggered, the processing is performed with the new operation file. Thus, even if the input/output control is switched to the new operation file during a series of processing performed with the current operation file while monitoring the status data, the processing can be performed with one of the operation files which corresponds to the content of the processing request.

According to still another aspect of this invention, the processing request after switching of the input/output control is judged. If the processing request is the one already triggered, the processing request is transmitted to the current operation file. Therefore, in case of the input/output control device comprising the current system and the spare system for example, the processing request can be transmitted from the spare system performing the processing with the new operation file to the current system performing the processing with the current operation file. Thus, even if the input/output control is switched from the current operation file to the new operation file, the processing request triggered in the current operation file can be continuously processed with the current operation file.

According to a further aspect of this invention, even if all processing is not completed due to the failure in processing with the current operation file, the operation file is updated after lapse of the predetermined time duration from the start of the processing with the new operation file. Thus, it is possible to prevent an unstable condition of the system as a result of long-time interruption of the parallel operation by both of the current and the spare systems.

According to a still further aspect of this invention, the discriminating information is copied from the current operation file to the new operation file upon switching of the input/output control. Therefore, as compared with the case where the all status data in the current operation file are copied, the data amount can be reduced and the copying time can be shortened. Accordingly, an input/output control switching time can be reduced so that the file update operation can be carried out without interrupting the online and realtime processing.

What is claimed is:

1. A file updating method of updating, into a new operation file, an operation file which is used in an input/output control device in controlling an input/output device, said input/output control device comprising first and second memories, each memorizing a current operation file as said operation file, first and second processors connected to said first and said second memories, respectively, and a storage medium for storage of said new operation file, each of said first and said second processors processing, when receives an external processing request from said input/output device, said external processing request into processed data in accordance with said current operation file, said first processor outputting said processed data to said input/output device, said file updating method being for updating the operation file of said input/output control device into said new operation file when said input/output control device receives an update request from said input/output device, said file updating method comprising:

a storing step at which said second processor stores, when said input/output control device receives said update request from said input/output device, said new operation file from said storage medium into said second memory with said second processor inhibited from receiving said external processing request;

a switching step at which switching of reception of said external processing request from said first processor to said second processor is executed at a switching timing after said new operation file is stored in said second memory, said second processor processing, when receiving said external processing request after execution of said switching, said external processing request into said processed data in accordance with said new operation file and outputting said processed data to said input/output device, said first processor being inhibited from receiving said external processing request after execution of said switching; and a replacing step at which said first processor replaces said current operation file of said first memory by said new operation file stored in said second memory after said first processor finishes processing, in accordance with said current operation file, said external processing request received at said first processor.

2. A file updating method as claimed in claim 1, further comprising:

another replacing step at which said first processor replaces said current operation file of said first memory by said new operation file stored in said second memory after lapse of a predetermined time duration from said switching timing even though said first processor does not yet finish processing, in accordance with said current operation file, said external processing request received at said first processor.

3. A file updating method of updating, into a new operation file, an operation file which is used in an input/output control device in controlling an input/output device, said input/output control device comprising first and second memories, each memorizing a current operation file as said operation file, first and second processors connected to said first and said second memories, respectively, and a storage medium for storage of said new operation file, each of said first and said second processors processing, when receiving an external processing request from said input/output device, said external processing request into processed data in accordance with said current operation file, said first processor outputting said processed data to said input/output device, said file updating method being for updating the operation file of said input/output control device into said new operation file when said input/output control device receives an update request from said input/output device, said file updating method comprising:

a storing step at which said second processor stores, when said input/output control device receives said update request from said input/output device, said new operation file from said storage medium into said second memory with said second processor inhibited from receiving said external processing request;

a switching step at which switching of reception of said external processing request from said first processor to said second processor is executed at a switching timing after said new operation file is stored in said second memory, said second processor receiving said external processing request after execution of said switching is carried out, said first processor being inhibited from receiving said external processing request after execution of said switching;

a judging step at which said second processor judges whether or not the external processing request received after execution of said switching is related to the external processing request which is received by said first processor before execution of said switching;

a forcing step at which, when said second processor judges that the external processing request received after execution of said switching is related to the external processing request received by said first processor before execution of said switching, said second processor forces said first processor to continuously process, in accordance with said current operation file, the external processing request received after execution of said switching;

a processing step at which, when said second processor judges that the external processing request received after execution of said switching is not related to the external processing request received by said first processor before execution of said switching, said second processor processes, into said processed data in accordance with said new operation file, the external processing request received after execution of said switching and outputs said processed data to said input/output device; and a replacing step at which said first processor replaces said current operation file of said first memory by said new operation file stored in said second memory after said first processor finishes processing, in accordance with said current operation file, the external processing request received from said input/output device before execution of said switching and the external processing request received from said second processor after execution of said switching.

4. A file updating method as claimed in claim 3, wherein said forcing step comprises:

a transmitting step at which, when said second processor judges that the external processing request received after execution of said switching is related to the external processing request received by said first processor before execution of said switching, said second processor transmits to said first processor the external processing request received after execution of said switching to force said first processor to continuously process, in accordance with said current operation file, the external processing request received after execution of said switching.

5. A file updating method as claimed in claim 3, further comprising:

another replacing step at which said first processor replaces said current operation file of said first memory by said new operation file stored in said second memory after lapse of a predetermined time duration from said switching timing even though said first processor does not yet finish processing, in accordance with said current operation file, the external processing request received from said input/output device before execution of said switching and the external processing request received from said second processor after execution of said switching.

6. A file updating method of updating, into a new operation file, an operation file which is used in an input/output control device in controlling an input/output device, said input/output control device comprising first and second memories, each memorizing a current operation file as said operation file, first and second processors connected to said first and said second memories, respectively, and a storage medium for storage of said new operation file, each of said first and said second processors processing, when receiving an external processing request from said input/output device, said external processing request into processed data in accordance with said current operation file, said first processor outputting said processed data to said input/output device and storing to said first memory discriminating information representative of the external processing request received by said first processor from said input/output control device, said file updating method being for updating the operation file of said input/output control device into said new operation file when said input/output control device receives an update request from said input/output device, said file updating method comprising:

a storing step at which said second processor stores, when said input/output control device receives said update request from said input/output device, said new operation file from said storage medium into said second memory with said second processor inhibited from receiving said external processing request;

a switching step at which switching of reception of said external processing request from said first processor to said second processor is executed at a switching timing after said new operation file is stored in said second memory, said second processor receiving said external processing request after execution of said switching is carried out, said first processor being inhibited from receiving said external processing request after execution of said switching;

a judging step at which said second processor judges with reference to said discriminating information stored in said first memory whether or not the external processing request received after execution of said switching is related to the external processing request which is received by said first processor before execution of said switching;

a forcing step at which, when said second processor judges that the external processing request received after execution of said switching is related to the external processing request received by said first processor before execution of said switching, said second processor forces said first processor to continuously process, in accordance with said current operation file, the external processing request received after execution of said switching;

a processing step at which, when said second processor judges that the external processing request received after execution of said switching is not related to the external processing request received by said first processor before execution of said switching, said second processor processes, into said processed data in accordance with said new operation file, the external processing request received after execution of said switching and outputs said processed data to said input/output device; and a replacing step at which said first processor replaces said current operation file of said first memory by said new operation file stored in said second memory after said first processor finishes processing, in accordance with said current operation file, the external processing request received from said input/output device before execution of said switching and the external processing request received from said second processor after execution of said switching.

7. A file updating method as claimed in claim 6, wherein said forcing step comprises:

a transmitting step at which, when said second processor judges that the external processing request received after execution of said switching is related to the external processing request received by said first processor before execution of said switching, said second processor transmits to said first processor the external processing request received after execution of said switching to force said first processor to continuously process, in accordance with said current operation file, the external processing request received after execution of said switching.

8. A file updating method as claimed in claim 6, further comprising:

another replacing step at which said first processor replaces said current operation file of said first memory by said new operation file stored in said second memory after lapse of a predetermined time duration from said switching timing even though said first processor does not yet finish processing, in accordance with said current operation file, the external processing request received from said input/output device before execution of said switching and the external processing request received from said second processor after execution of said switching.

* * * * *